March 4, 1947.  I. M. WHITE  2,416,787
VALVE
Filed June 25, 1943  3 Sheets-Sheet 1
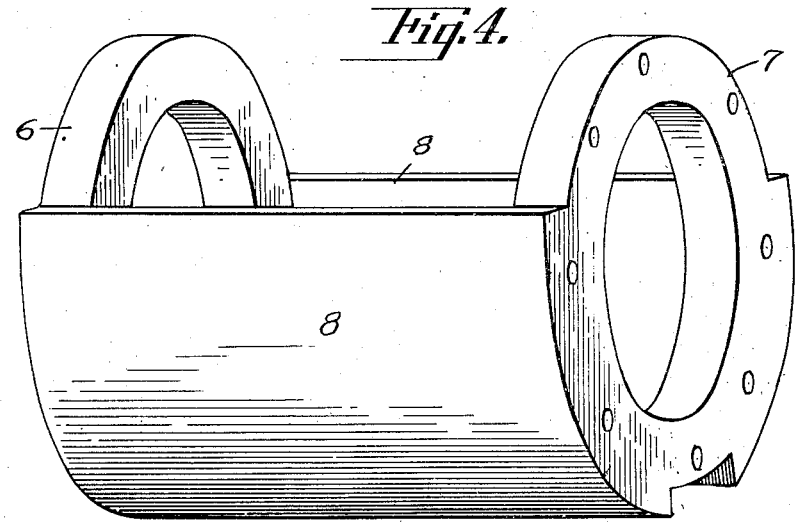
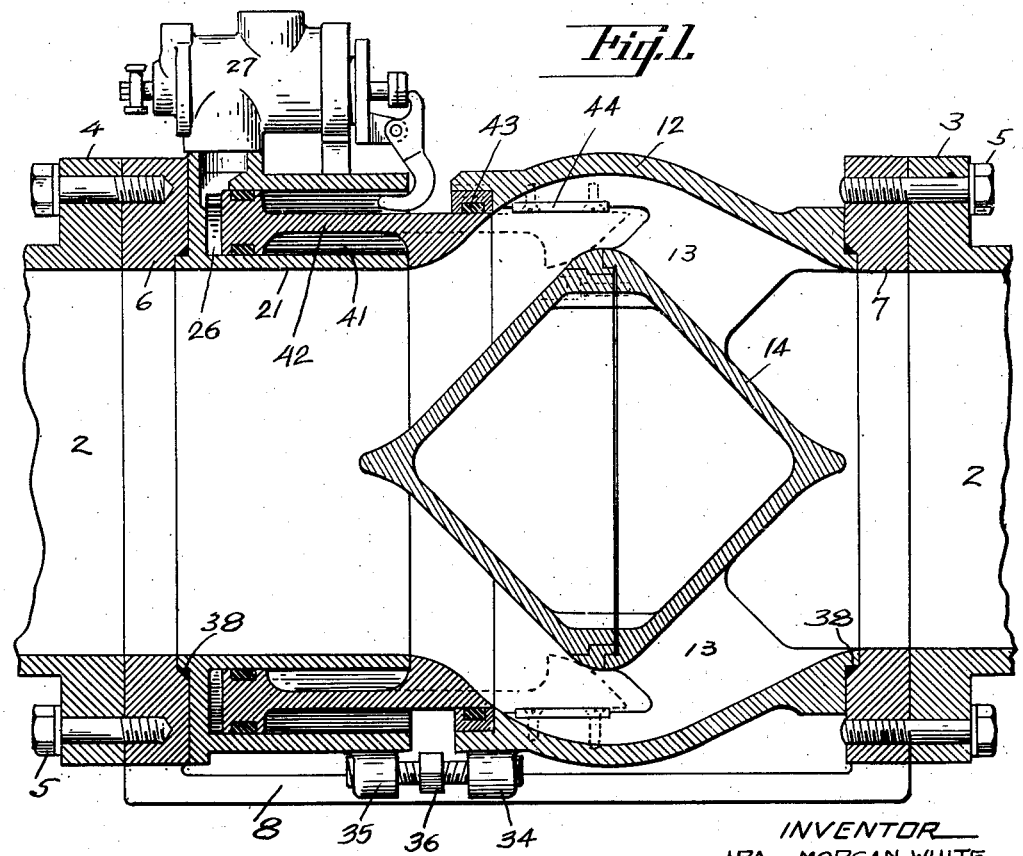
INVENTOR
IRA MORGAN WHITE
BY Marcus Lothrop
his ATTORNEY.

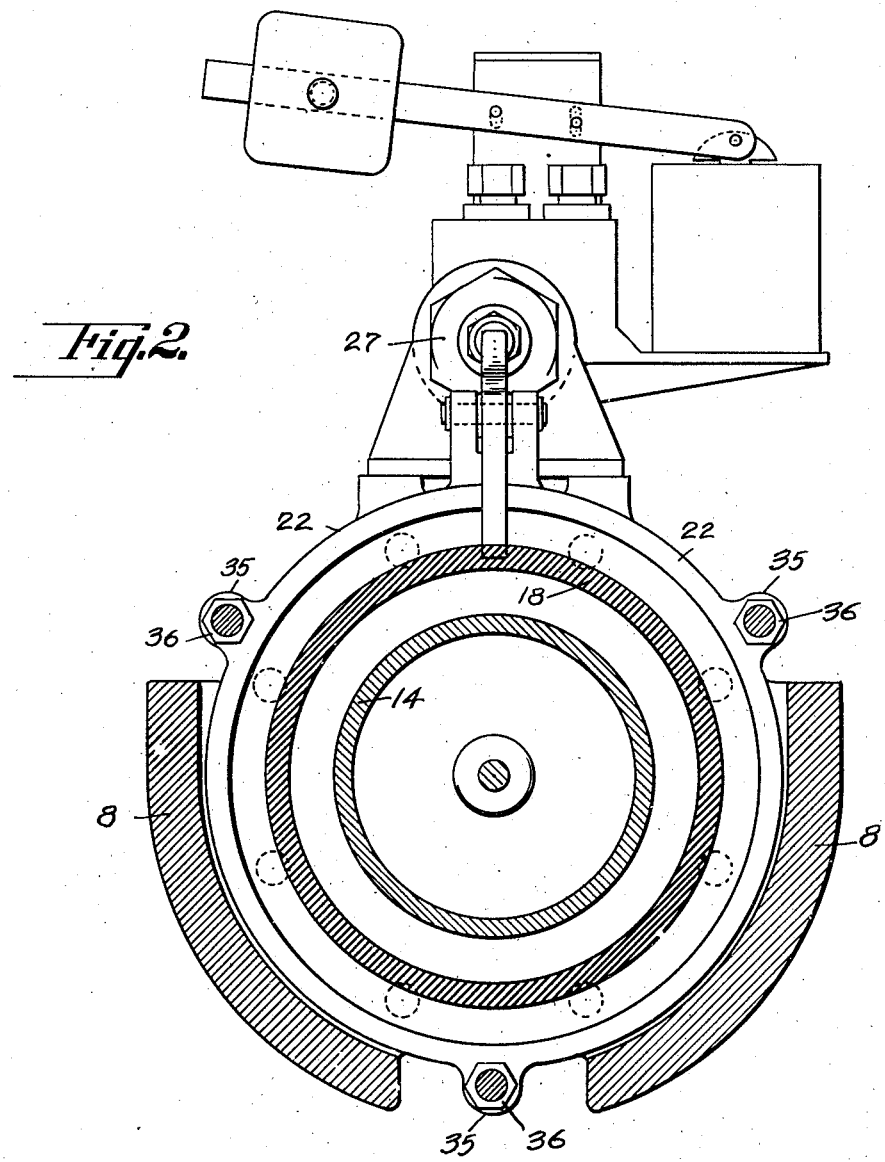

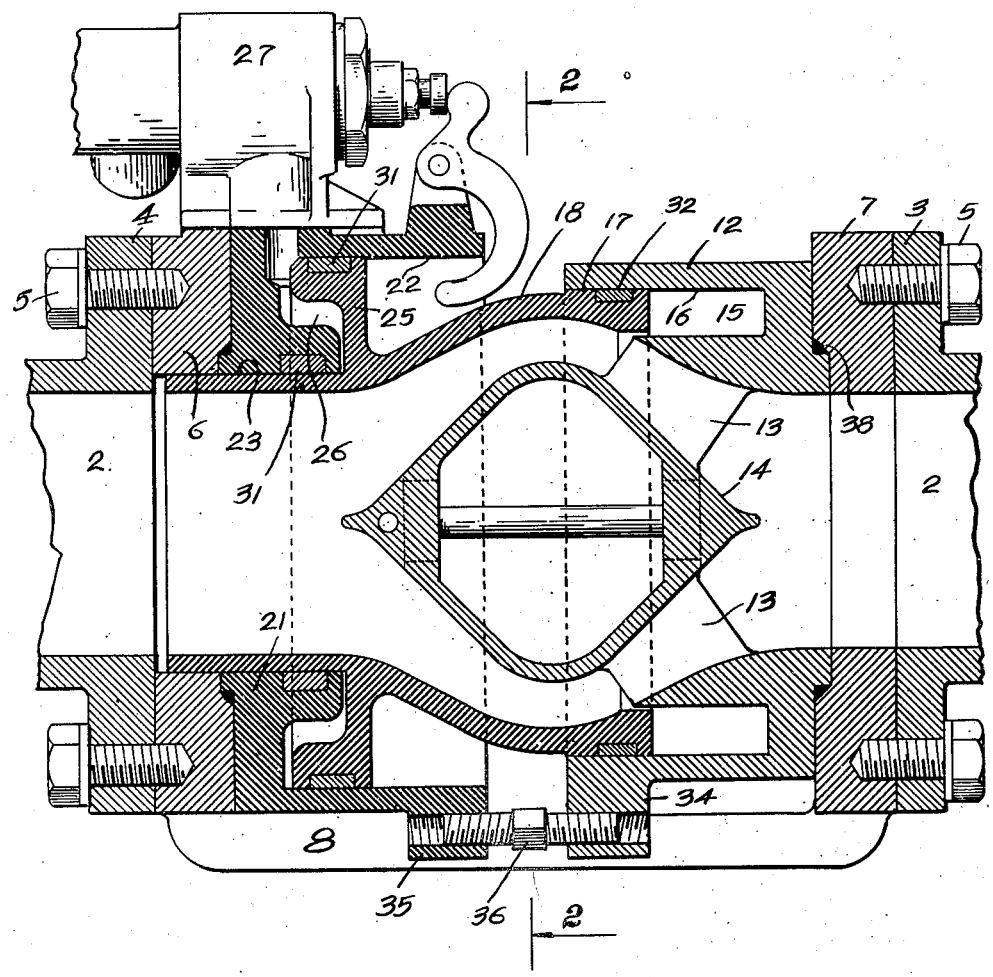

Patented Mar. 4, 1947

2,416,787

UNITED STATES PATENT OFFICE 2,416,787

VALVE

Ira Morgan White, Oakland, Calif., assignor to The Pelton Water Wheel Company, San Francisco, Calif., a corporation of California Application June 25, 1943, Serial No. 492,278

9 Claims. (Cl. 137—139)

The invention relates to valves for insertion in pipe lines to control the flow of water therethrough. The invention relates further to a sleeve type valve through which, when in full open position, the water will pass with a minimum loss of head.

An object of the invention is to provide a valve for a heavy duty pipe line which may be taken down to remove the working parts of the valve without taking down any portion of the pipe line.

Another object of the invention is to provide a valve for a heavy duty pipe line in which the heavy valve body remains in the line when it is desired to remove the working parts of the valve.

A further object of the invention is to provide a sleeve valve, the working parts of which may be collapsed for ready removal from the valve body.

The invention possesses other advantageous features, some of which with the foregoing will be set forth at length in the following description where I shall outline in full that form of the invention which I have selected for illustration in the drawings accompanying and forming part of the present specification.

In said drawings—

Fig. 1 is a longitudinal section through a sleeve valve inserted in a pipe line, embodying the features of my invention.

Fig. 2 is a cross section of a modified form of sleeve valve shown in Fig. 3, the section being taken on the line 2—2, Fig. 3.

Fig. 3 is a longitudinal section through a modified form of sleeve valve embodying my invention.

Fig. 4 is a perspective view of the valve body, or cradle, which is designed to be permanently fixed in the pipe line and into which and from which the working parts of the valve are readily inserted or removed.

In valves in large pipe lines through which water usually flows at a relatively high velocity and under very high pressure, it is of major importance that when the valve is in full open position that the water flows through the valve with the minimum of resistance and the minimum of disturbance. This is preferably accomplished by providing a valve which when in full open position, provides a water flow area of the same magnitude in cross section as the water flow area in the adjacent portions of the pipe line, and in which valve, the direction of flow of the water is interfered with to a minimum degree. This is preferably accomplished by means of a sleeve valve having a bulging body which cooperates with a streamlined plug, the contour of the body and the plug being such that the water flows past the plug with a minimum of disturbance and with a minimum variation in velocity. These valves are subject to wear, primarily due to corrosion or the presence of solid matter in the water stream and consequently must be removed from the pipe line at intervals for the purpose of inspection, repair or replacement. In pipe lines of large diameter, particularly lines carrying water under high pressure and moving at high velocity, the removal of the valve presents a problem, due to the fact that the pipe line is held rigid in heavy foundation and cannot be readily taken down to permit the removal of the valve. Further, valves of this type are of very heavy construction and sometimes of great weight and the removal of the heavy valve often requires the use of special rigging which is not available at the site.

In accordance with my invention I provide a sleeve valve, the working and wearable parts of which may be removed, without taking down the pipe line or any portion of it. This is accomplished by forming the valve structure in such manner that it may be collapsed or foreshortened in the direction of the water flow, so that the valve may be readily removed from between the flanges or fixed abutments between which it is installed. These flanges or abutments, which form part of the valve body, remain in the pipe line and since the body constitutes a large percentage of the total weight of the valve, this construction, in which the valve body remains in the line, greatly reduces the weight to be handled when it becomes necessary or desirable to remove the valve from the line for inspection, repair or replacement of the working parts.

The valve of my invention is particularly adapted for insertion in a pipe line 2, the adjacent ends of which, between which ends the valve is inserted, are provided with flanges 3 and 4 to which the body of the valve is secured by suitable means such as the cap screws 5. The valve comprises a body having end flanges 6 and 7 which abut against the flanges 3 and 4 on the adjacent ends of the pipe line, the body being held in place by the cap screws 5. These flanges form fixed abutments and are preferably held in fixed relation to each other by the longitudinal webs 8 preferably formed integrally with the flanges 6 and 7, and, with such flanges, forming an open-top or laterally open cradle into which the working parts of the valve may be readily inserted or from which they may be readily removed. The webs or side walls 8 of the valve body are preferably arranged to provide a clear open space, equal to the internal diameter of the body, through which the working parts of the valve may be moved. The working parts of the valve comprise the cylindrical section 12 or tubular guide which carries, by means of the webs 13, the streamlined plug 14, the plug being so shaped with respect to the passage through the cylindrical body 12, that the cross-sectional area of the water passage remains constant so that minimum resistance is imposed to the passage of the water through the valve. The body 12 is provided with an annular recess 15 having a bearing surface 16 which is engaged by a complementary bearing surface 17 on the sleeve 18 which is movable longitudinally into and out of contact with the plug 14. At its other end, the sleeve 18 has a bearing surface on the cylindrical member 21 or tubular guide which is in tight contact with the flange 6. The cylindrical member 21 is preferably formed with two bearing surfaces 22 and 23 which are engaged by complementary surfaces on the sleeve 18. Between the cylindrical member 21 and the flange 25 on the sleeve 18 there is provided an annular chamber 26. The admission of fluid under pressure into this chamber moves the sleeve in the direction to close the valve and the release of the fluid from this chamber permits the pressure existing in the pipe line to move the sleeve in the direction to open the valve. The entrance and discharge of fluid from the annular chamber 26 is controlled by the valve 27 which may be of any suitable design. Between the bearing surfaces 22 and 23 on the cylindrical member 21 and the complementary bearing surfaces of the sleeve 18, there are provided suitable sealing rings 31 for preventing leakage into or out of the annular chamber 26. Similarly, a sealing ring 32 is provided between the sleeve 18 and the cylindrical member 12. The two cylindrical or tubular guide units 12 and 21 form coaxial continuations of the pipe line except for a gap between them which is closed or spanned by the sleeve 18.

Means are provided for foreshortening the operative valve structure comprising the two cylindrical units 12 and 21 and the sleeve 18 to move the units 12 and 21 out of contact with the flanges 7 and 6, respectively, to permit the valve-operating mechanism to be lifted out of the cradle. To accomplish this purpose, the cylindrical unit 12 is provided with a plurality of lugs or bosses 34 and the cylindrical unit 21 is provided with a plurality of aligned bosses 35. These bosses are provided with screw-threaded bores and each pair of aligned bores is engaged by a jack screw 36 having right and left-hand threads so that rotation of the jack screw moves the cylindrical elements 12 and 21 axially with respect to the flanges 6 and 7. Rotation of the screws in one direction serves to collapse or foreshorten the valve structure so that it can be readily lifted from the cradle and, when foreshortened and inserted into the cradle, rotation of the jack screws serves to force the ends of the cylindrical structures 12 and 21 into tight contact with the opposed face surfaces of the flanges 6 and 7. Gaskets 38 are provided to prevent leakage through the tight joint between the flanges and the ends of the cylindrical structures.

In the modified form of valve shown in Fig. 1, the construction is substantially the same as that shown in Fig. 3 with the exception that the cylindrical member 12 is extended and the sleeve is shortened. In this construction, the cylindrical member 12 extends over beyond the center of the plug 14 and the cylindrical member 21 is modified by the provision of an annular recess 41 in which the slide 42 moves. The slide forms a bearing at 43 against the forward surface of the cylindrical member 12, and a guide plate 44 is provided for guiding and supporting the sleeve when it is extended to valve closing position. The annular chamber 41 is of sufficient depth so that the chamber 26 is provided behind the head of the sleeve and the flow of liquid into and out of this chamber controls the movement of the sleeve valve. It is understood that the water is discharged from the pipe line before the valve structure is foreshortened for the purpose of removing it from the cradle.

I claim:

1. A valve for insertion in a pipe line including a cradle adapted to be fixed in the pipe line, a flange on each end of the cradle, a two part valve body insertable into said cradle and expansible to bring the parts respectively into tight contact with said flanges, a plug on one of said parts, and a movable sleeve valve forming a tight sliding contact with said parts and movable into and out of engagement with said plug.

2. A valve including a cradle, a flange on each end of the cradle, a cylindrical body member engaging one flange, a cylindrical body member engaging the other flange, a plug carried by one of said body members, a sleeve valve mounted in the other body member and movable into and out of engagement with said plug and means for moving said body members relatively to each other to move them into and out of engagement with said flanges.

3. A valve comprising a cradle, flanges on the ends of the cradle, a cylindrical body member abutting one flange, a plug fixed in said body member, a second cylindrical body member abutting the other flange, a sleeve bearing in said second body member and movable into and out of engagement with said plug and means for relatively moving said body members in the direction of movement of the sleeve, to move said body members out of engagement with said flanges.

4. A device of the character described comprising: a cradle arranged to be inserted in a pipe line; a two part casing accommodated within said cradle; means for detachably sealing the ends of said casing in fluid tight relationship to the ends of said cradle; and a closure member operatively engaging the two parts of said casing in fluid tight relationship therewith.

5. A device of the character described comprising: a valve cradle provided with flanged ends; an extensible two part, tubular valve casing accommodated within said cradle; a tubular valve closure member engaging the two parts of said valve casing in fluid tight relationship therewith; and means for extending the two parts of said valve casing into fluid tight contact with said flanged ends.

6. A valve for insertion in a pipe line comprising a cradle adapted to be fixed in the pipe line, a pair of tubular guides, a valve plug on one of said guides, means for forcing said guides against said cradle, and a sleeve slidable on said guides toward and away from a position against said valve plug.

7. A valve for insertion in a pipe line comprising a cradle adapted to be fixed in the pipe line, a pair of tubular guides, means for removably mounting said tubular guides in said cradle to continue said pipe line except for a gap between the ends of said guides, a valve plug on one of said guides, and a sleeve spanning said gap and slidable on said guides toward and away from abutment with said plug.

8. A valve for insertion in a pipe line comprising a laterally open cradle having a pair of face surfaces and adapted to be fixed in the pipe line, a pair of tubular guides adapted to be moved laterally into said cradle and disposed coaxially with said pipe line, means for forcing said coaxial guides into abutment with said face surfaces, a valve plug on one of said guides, and a sleeve coaxial with and slidable on said guides toward and away from abutment with said plug.

9. A valve for insertion in a pipe line comprising a laterally open cradle having a pair of face surfaces and adapted to be fixed in the pipe line, a pair of tubular guides adapted to be moved laterally into said cradle, means for mounting said guides in said cradle to serve as fluid tight continuations of said pipe line except for a gap between the ends of said guides, a sleeve spanning said gap and slidable on said guides in fluid tight relationship therewith, and means acting with said sleeve for controlling flow through said pipe line.

IRA MORGAN WHITE.

REFERENCES CITED

The following references are of record in the file of this patent:

UNITED STATES PATENTS

| Number | Name | Date |
|---|---|---|
| 301,821 | Kroog | July 8, 1884 |
| 2,124,334 | Cray | July 19, 1938 |